(12) United States Patent
Bhakta et al.

(10) Patent No.: US 9,342,530 B2
(45) Date of Patent: May 17, 2016

(54) METHOD FOR SKIPPING EMPTY FOLDERS WHEN NAVIGATING A FILE SYSTEM

(71) Applicant: Pro Softnet Corporation, Calabasas, CA (US)

(72) Inventors: Palak Bhakta, Los Angeles, CA (US); Vilabh Mishra, Glendale, CA (US)

( * ) Notice: Subject to any disclaimer, the term of this patent is extended or adjusted under 35 U.S.C. 154(b) by 424 days.

(21) Appl. No.: 13/775,082

(22) Filed: Feb. 22, 2013

(65) Prior Publication Data

US 2014/0244698 A1    Aug. 28, 2014

(51) Int. Cl.
*G06F 7/00*        (2006.01)
*G06F 17/30*       (2006.01)

(52) U.S. Cl.
CPC .... *G06F 17/30221* (2013.01); *G06F 17/30091* (2013.01)

(58) Field of Classification Search
CPC .................. G06F 17/30436; G06F 17/30442; G06F 17/30091; G06F 17/30211; G06F 17/30619; G06F 17/30831
USPC ......................................... 707/718, 822, 828
See application file for complete search history.

(56) References Cited

U.S. PATENT DOCUMENTS

| | | | |
|---|---|---|---|
| 6,874,130 B1* | 3/2005 | Baweja et al. | 715/805 |
| 7,617,458 B1* | 11/2009 | Wassom et al. | 715/760 |
| 2005/0278351 A1* | 12/2005 | Niyogi et al. | 707/100 |
| 2006/0036568 A1* | 2/2006 | Moore et al. | 707/1 |
| 2009/0063547 A1* | 3/2009 | Wright et al. | 707/102 |
| 2011/0145218 A1* | 6/2011 | Meyerzon et al. | 707/709 |
| 2011/0239164 A1* | 9/2011 | Saraiya et al. | 715/854 |
| 2014/0089347 A1* | 3/2014 | Thelen | 707/783 |

* cited by examiner

*Primary Examiner* — James Trujillo
*Assistant Examiner* — Jessica N Le
(74) *Attorney, Agent, or Firm* — Bruce Hare; Palak Bhakta (57) ABSTRACT

A method for skipping empty folders when navigating a file system. When a parent folder only contains a single child folder and a user is trying to view the contents of the parent folder, the user will be directed to the contents of the child folder rather than the contents of the parent folder. When multiple nested folders are present in a particular path, all nested folders containing only a single child folder will be skipped and the user will be taken directly to the first nested folder in the hierarchy that contains multiple data items, a single file, or no data.

14 Claims, 8 Drawing Sheets

METHOD FOR SKIPPING EMPTY FOLDERS WHEN NAVIGATING A FILE SYSTEM

BACKGROUND

Users of electronic devices store data files at a variety of different places including hard drives on personal computers, transportable media such as CD's, DVDs, USB storage devices and portable hard drives, as well as on remote storage devices accessible using the Internet, often referred to as the "cloud". Recently, users have started using the cloud more predominantly to backup all or most of their important data from their multiple electronic devices for safe keeping, disaster recovery, and/or anytime access via an Internet connection.

Data on electronic devices are customarily stored on computer readable mediums and organized in a file system. File systems typically use folder structures to organize all the data into hierarchical trees on the electronic device. For example, when programs are installed, they are installed in an identifiable folder for the particular program and may have nested sub folders for organizing other program data. Users may also organize their documents, photos, videos, and other personal data files in different folders.

With the expansion of cloud based services many users now have the ability to selectively choose folders of files to store in the cloud. These folders and/or files may be backed up on any user defined frequency, in real time or at a scheduled time, in order to ensure that the most up to date data is safely stored in the cloud. In order to track which files have been saved to the cloud, many remote storage providers retain the file path of each folder and/or file for each user device in order to accurately track a set of data that is being stored or backed up to the cloud.

When a deeply nested folder is selected for backing up to remote storage, the folder hierarchy may be retained as a file path to track each file so the same file is not transmitted during a subsequent backup operation. When these files are transmitted, only files in the user selected folder for backup are transmitted to the remote storage, not files in any parent or intermediate folders along the file path. When multiple computers are sending data to a single remote storage account, each computer's data may be tracked using a computer identifier/name as a root folder on the remote storage. Therefore, when a user is navigating his remote storage account, he may be presented with a root folder that has several empty nested folders in the file path before reaching the folder containing the files which were transmitted to the remote storage location. To navigate to the intended folder, the user may be required to make several clicks in order to click through every nested folder, starting at the root folder which may be the computer name. Many of the intermediate folders may be empty before arriving to the desired files that were transmitted to the remote storage.

Similarly, with respect to a local file system, when as the user moves files around or a program is installed and then uninstalled from a device's storage, there may be instances where nested sub folders are left empty containing no files or only hidden system files. Therefore, in such instances, a user may be required to click through many empty nested intermediate folders before arriving to the desired files.

For these reasons, there exists a need for a solution that allows a user to navigate to folders containing data items with fewer clicks while still being able to ascertain the exact location of such data in the folder hierarchy.

BRIEF SUMMARY

Some embodiments provide a feature that allows users to automatically skip or jump past empty child folders (i.e., folders having only a single child folder and no other data items) while navigating local or remote file systems. The feature may be provided in the form of an application plugin for a file system or integrated into an application for navigating local or remotely stored data.

Some embodiments may use a recursive check to ascertain when a folder contains only a single child folder. When the recursive check reaches a child folder containing two or more data items (i.e. files and/or folders), a single file, or no data, the user is taken to that file path immediately, circumventing any intermediate sub folders that contain no data other than a single child folder.

Some embodiments may use a method whereby folders are indexed and folders that contain no data other than a single child folder are designated as folders to be "jumped". Folders designated as jump folders may be linked to the first nested folder file path that includes two or more data items, a single file, or no data. Particular user interactions with any parent folders with a single child folder may automatically navigate the user to the linked folder path where multiple data items are first present.

Some embodiment receive a user input to view contents of a folder in the file system, identify a destination nested folder within the folder where the destination nested folder is a first nested folder that contains (i) two or more data items, (ii) a single file, or (iii) no data items, and the user is then displayed the contents of the destination nested folder in response to the user input.

Some embodiments index a file system to ascertain when to jump a folder by first setting a jump status for all non-folder data items in a file system to false, then identifying a set of folders in the file system that contain only one child folder and either (i) no other data items or (ii) data items designated in an exclusion list, as jump folders. Then the jump status of all jump folders are set to true and the jump status for all folders that are not jump folders are set to false. Next, a destination folder is identified for each jump folder where the destination folder is a first nested folder within the jump folder that contains (i) two or more data items, (ii) a single file, or (iii) no data items. Then each jump folder is linked to the jump folder's identified destination folder. When a user input to view the contents of a file folder in the file system is received, the user will be displayed the content of the file folder if the jump status of the file folder is set to false or the contents of the jump folder's identified destination folder if the jump status of the file folder is set to true.

Another exemplary embodiment may designate a set of folders in a file system that contain (i) two or more data items, (ii) a single file, or (iii) no data items, as standard folders and then designate a set of folders in the file system not identified as standard folders as jump folders. Then a destination folder for each jump folder may be identified where the destination folder is a nested folder within the jump folder that contains (i) two or more data items, (ii) a single file, or (iii) no data items. When a user input to view the content of a selected jump folder is received, the user is displayed the contents of the selected jump folder's destination folder.

The preceding Summary is intended to serve as a brief introduction to some embodiments of the invention. It is not meant to be an introduction or overview of all inventive subject matter disclosed in this document. The Detailed Description that follows and the Drawings (i.e. "Figs.") that are referred to in the Detailed Description will further describe exemplary embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed and using different embodiments without departing from the spirit or scope of the invention.

Figure 1:
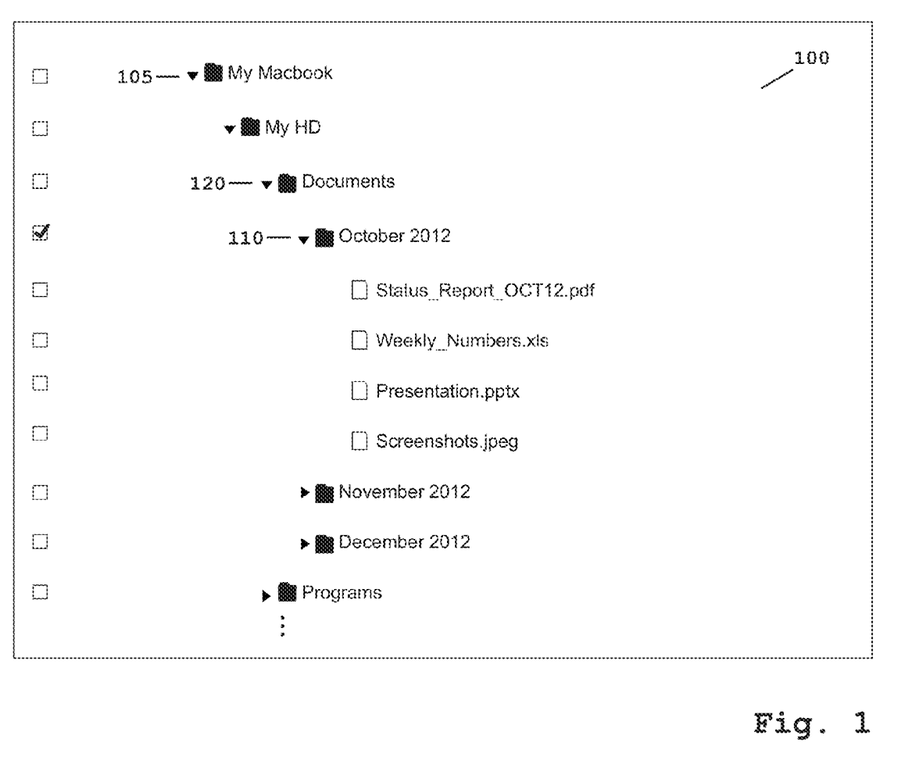
FIG. 1 illustrates an exemplary file system of a computer operating system.

The following description will discuss an exemplary use of a present invention where empty child folders may be jumped or skipped during the navigation of a file system. FIG. 1 illustrates an exemplary file system 100 of a computer operating system. As illustrated, there is one root folder 105 for a computer named "My Macbook" that contains several nested folders. In this file system 100, the nested folder "Documents" 120 contains three child folders. If this file system 100 represented a local file system on a user computer, each child folder shown in FIG. 1 may contain several data items (e.g., files or folders). However, when storing some of this data on remote storage a user may wish to only store certain data to remote storage rather than his entire local file system.

For example, a user may wish to duplicate or backup data in the October 2012 child folder 110. When this folder 110 is transmitted to remote storage for backup or disaster recovery, all files in intermediate folders may not be transmitted since only folder 110 is selected for transmission to remote storage. However, the file path of each data item in the folder 110 will be retained at the remote storage to allow the remote storage server to track which data items have been backed up and to keep backed up files up to date. Since the file path (i.e. folder structure) is retained, the folder 110 will be transmitted as a nested folder under the root folder My Macbook 105.

Figure 2:
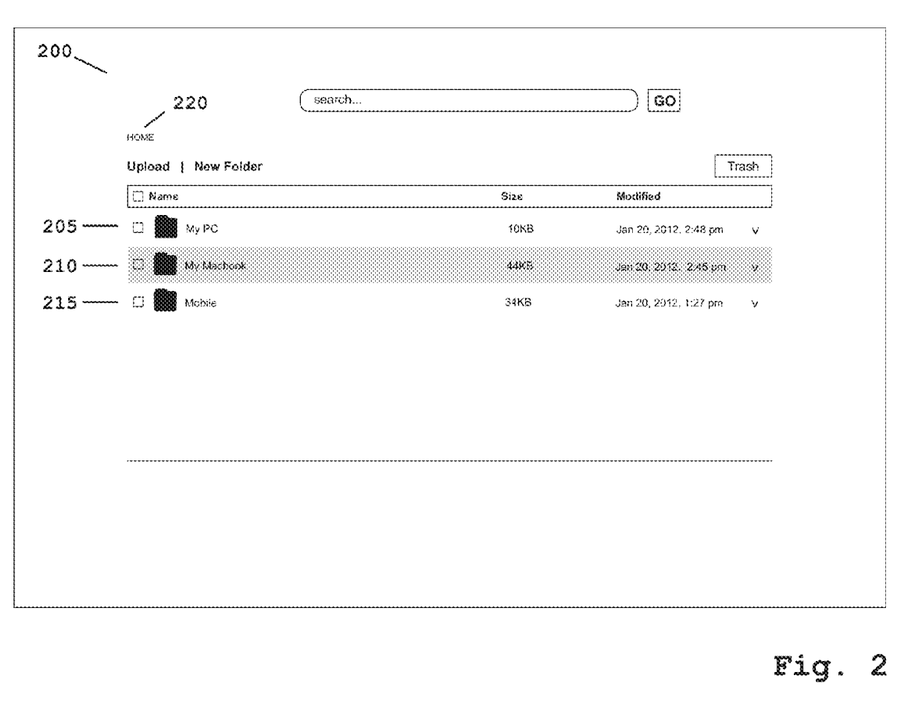
FIG. 2 illustrates a remote storage area storing files from multiple computing devices.

FIG. 2 illustrates an exemplary graphical user interface of a remote storage and/or backup solution. In this example, the main screen 200 of the remote storage is displays the home directory 220. As illustrated, data from three user devices, "My PC" 205, "My Macbook" 210, and "Mobile" 215, are associated with the remote storage account. Starting at the home directory 220, a user can navigate his remote storage file system to see files which have been stored from each respective user device or computer.

As indicated in FIG. 1, the October 2012 folder 110 is the only folder stored at the remote storage from user computer My Macbook 105. When the user wishes to navigate to the remotely stored files within the folder 110, the user will have to make several clicks before arriving to the desired files.

Figure 3:
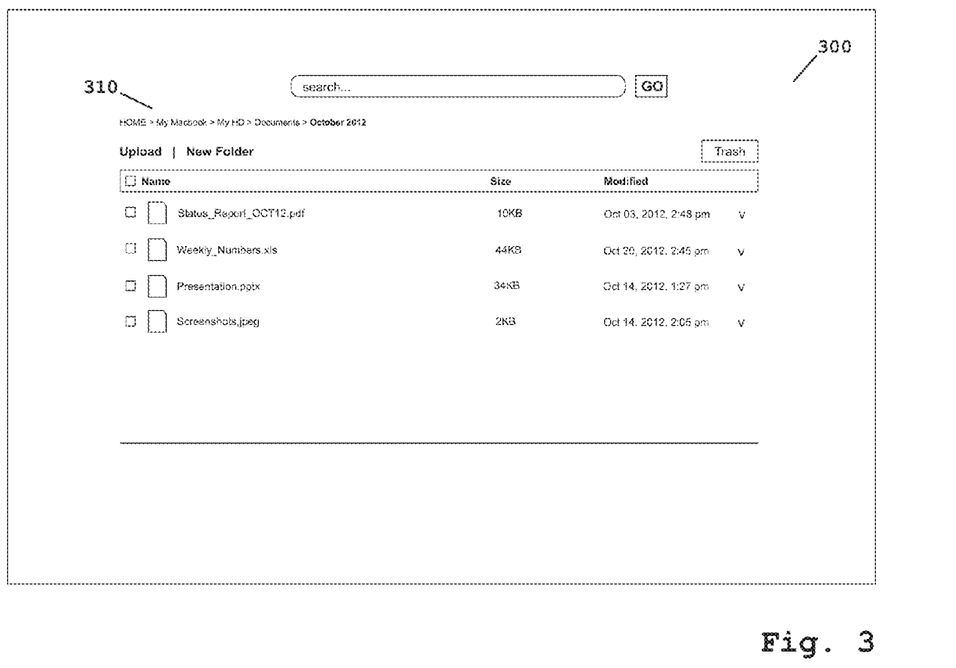
FIG. 3 illustrates an exemplary navigation area of a remote storage area.

FIG. 3 illustrates the remote storage interface 300 displaying the remotely stored files of the October 2012 folder 110. The file path or breadcrumb trail 310 may also be displayed to allow the user to keep track of their location in the remote file system. As shown, to arrive at the data items stored in the folder 110, the user is required to click on the folders "My Macbook" then "My HD," "Documents," and finally "October 2012" before arriving to the remotely stored files. This requires the user to navigate through five screens with four single or double clicks, where each click or double click advances the user to the contents of the clicked folder.

The method of the present invention may alleviate the need for excessive clicks and navigation of multiple screens by taking the user directly to the content of the October 2012 folder 110 with a single click. Since the intermediate folders at the remote storage are only used for tracking data items transmitted from folder 110, they are all empty and only contain a single child folder. Therefore, rather than requiring a user to click through empty folders only containing a single child folder, the user may automatically be taken to the contents of the first folder down the hierarchy that contains at least two data items (i.e. files and/or folders), a single data file, or no date items after which the user can then view the desired data items or navigate to further nested data items when present. If the user wishes to navigate to one of the intermediate folders, to copy data items into an intermediate folder for example, the user may click on the desired folder on the breadcrumb trail 310 to navigate directly to that intermediate folder which may have been jumped using the method of the present invention. If the user clicks on an intermediate folder within the file system view, rather than on the breadcrumb trail, the user may be directed to the intermediate folder's associated destination folder.

In this example, if the Documents folder 120 in FIG. 1 was selected for storage with the remote storage service provider, then child folders October 2012, November 2012, and December 2012 would all be transmitted to the remote storage. In this instance, when a user click on My Macbook from the home screen 200 illustrated in FIG. 2, the user would be taken directly to the contents of the Documents folder 120 since there are multiple data items located in the folder 120, namely the three child folders.

Figure 4:
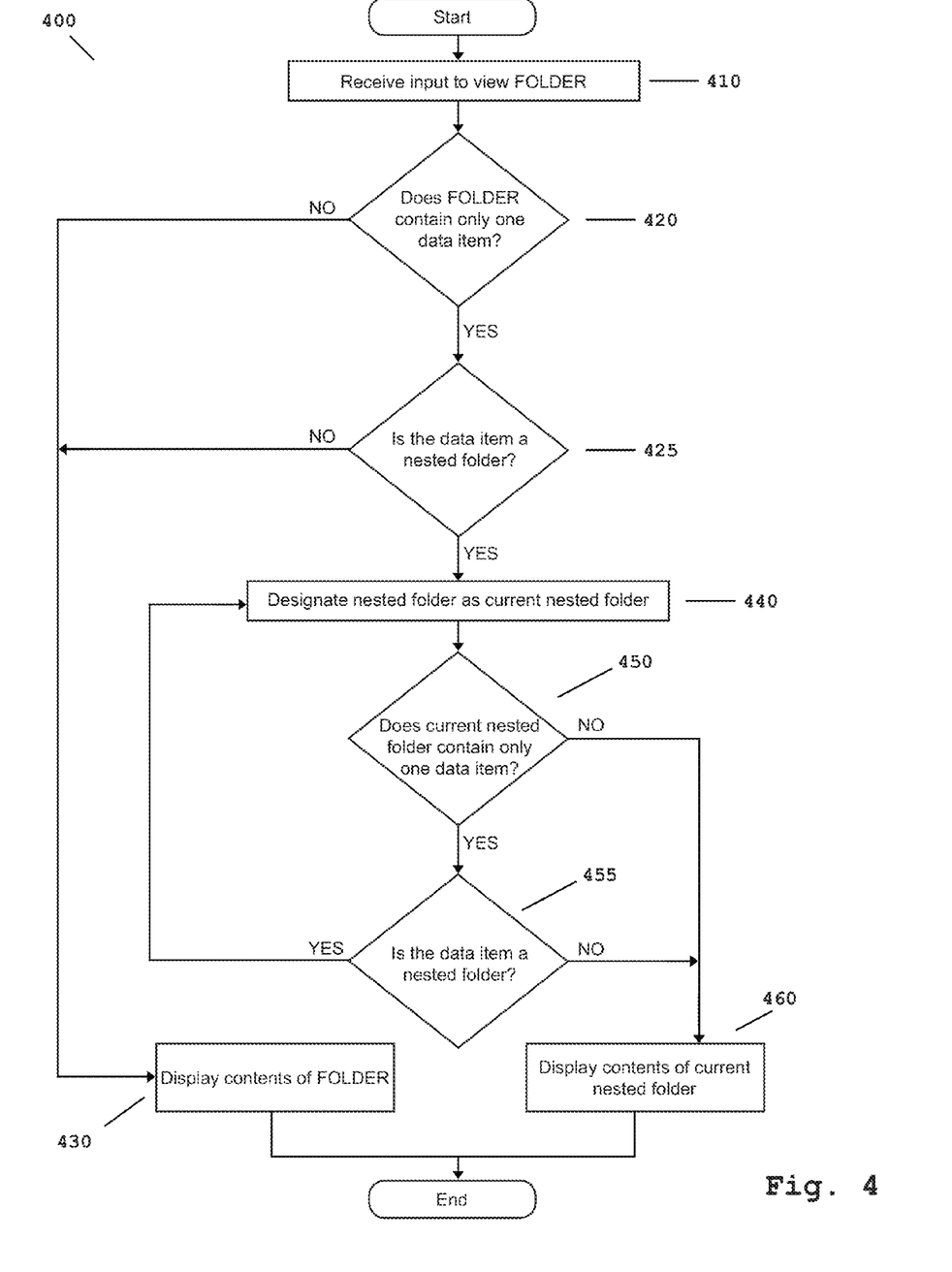
FIG. 4 illustrates a flow chart of a conceptual recursive process used by some embodiments to jump empty folders.

In one embodiment, a recursive method may be implemented to check the contents of a folder before taking a user to a particular destination folder. FIG. 4 illustrates a flow chart of a conceptual recursive process 400 used by some embodiments to jump past empty folders that may contain only one child or nested folder. The recursive process 400 may begin when a user clicks on any folder to view that folder's contents. The process 400 first receives (at 410) the user input to view a folder. Next, the process determines (at 420) whether the folder contains only one data item (i.e. file and/or folder) by checking the contents of the selected folder. If it is determined that there is more than one data item in the folder, the process 400 will display (at 430) the contents of the folder and end.

If only one data item is present in the folder, the process 400 will then determine (at 425) whether the single data item is a nested folder rather than a data file. If the data item is not a nested folder, then the process 400 will display (at 430) the contents of the folder and end. However, if it is determined (at 425) that the data item is a nested folder, the process 400 will then designate (at 440) the nested folder as the current nested folder.

The process 400 will then determine (at 450) whether the current nested folder contains only one data item. If it is determined that there is more than one data item in the nested folder, the process 400 will display (at 460) the contents of the current nested folder and end. If only one data item is present in the current nested folder, the process 400 will then determine (at 455) whether the single data item is a nested folder and not a data file. If the data item is not a nested folder, then the process 400 will display (at 460) the contents of the current nested folder and end. However, if it is determined (at 455) that the data item is another nested folder, the process 400 will then mark (at 440) the nested folder as the current nested folder. Then, steps 450, 455, and 440 will continue recursively until it is determined that the current nested folder contains either more than one data item (at 450) or if the only data item is a data file (at 455) after which the contents of the current nested folder are displayed (at 460) and the process 400 ends.

Although this recursive process 400 jumps only single nested folders where no other data items are present, it would be apparent to one of ordinary skill in the art that other checks may be implemented within the process 400. For example, some embodiments may be able to jump data items designated in an excluded list. This circumstance may arise when data items such as hidden files/folders or system files/folders are present inside a folder. A user may be able to designate such data items in an exclusion list (by file name or file extension, for example) thereby treating those data items as if they are not present in a folder. Therefore, when a particular folder's contents are checked and the particular folder contains one nested folder and one or more data items that are designated in the exclusions list, the user will still be jumped past the nested folder because the data items in the exclusion list are ignored and not considered as present data items with respect to the recursive process 400.

The recursive process is one method to accomplish reducing the number of user clicks before arriving to the desired data; however the process may use system resources each time the recursive process is executed. If a recursive algorithm is executed on a remote server that handles several hundred or thousand user accounts, for example, the process may use system resources and processing power that other system components may require and in turn adversely affect the overall performance of the remote server. Therefore, a non-recursive method may be used where data items in a file database are designated with a jump status and linked to an appropriate path that jumps or skips over empty intermediate nested folders when they exist.

Figure 5:
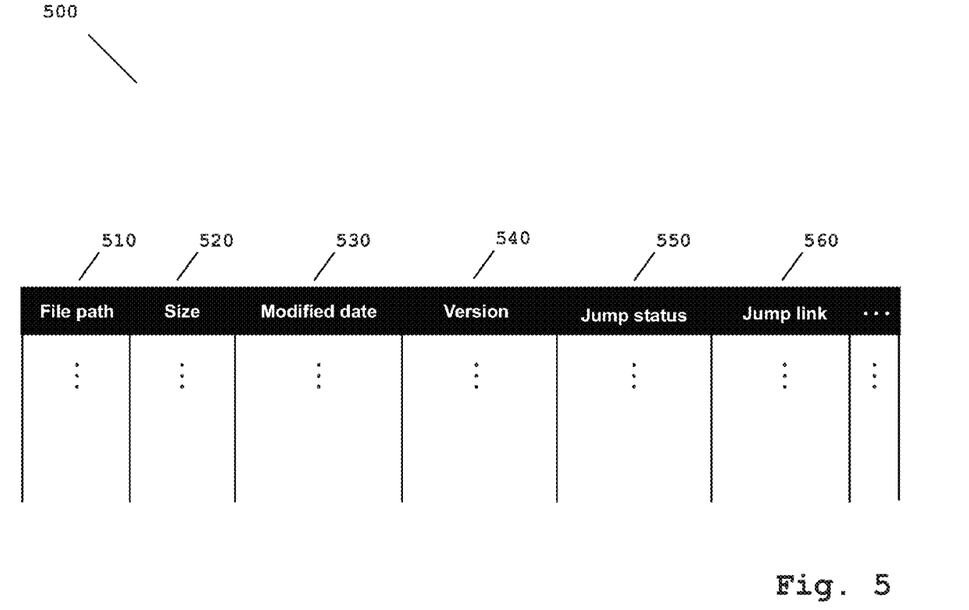
FIG. 5 illustrates an exemplary table used to index data items in a file system.

FIG. 5 illustrates an exemplary table 500 that may be used to maintain data items in a file system. The table 500 may be also be used as an index to identify all data items stored on remote file system within a cloud backup and/or synchronization service, for example. The table/index may have several fields where each data item (i.e. files and folders) has an entry in the table. As illustrated, each data item can have several attributes which may include the data item's file path 510, size 520, last modified date 530, version 540, among others. To implement the present invention, one embodiment may insert two fields into this table/index, a jump status 550 and a jump link 560.

The jump status field 550 of each data item may be set to 'true' or 'false' based on the whether the data item is a folder containing only a single nested folder with no other data items present. The jump link field 560 may be null if the jump status of a data item is false. If the jump status is true for a data item, then the jump link may provide a file path that directs the user to the appropriate location within the local or remote file system, where the linked location circumvents navigation through one or more nested folders that have no other accompanying data items.

Figure 6:
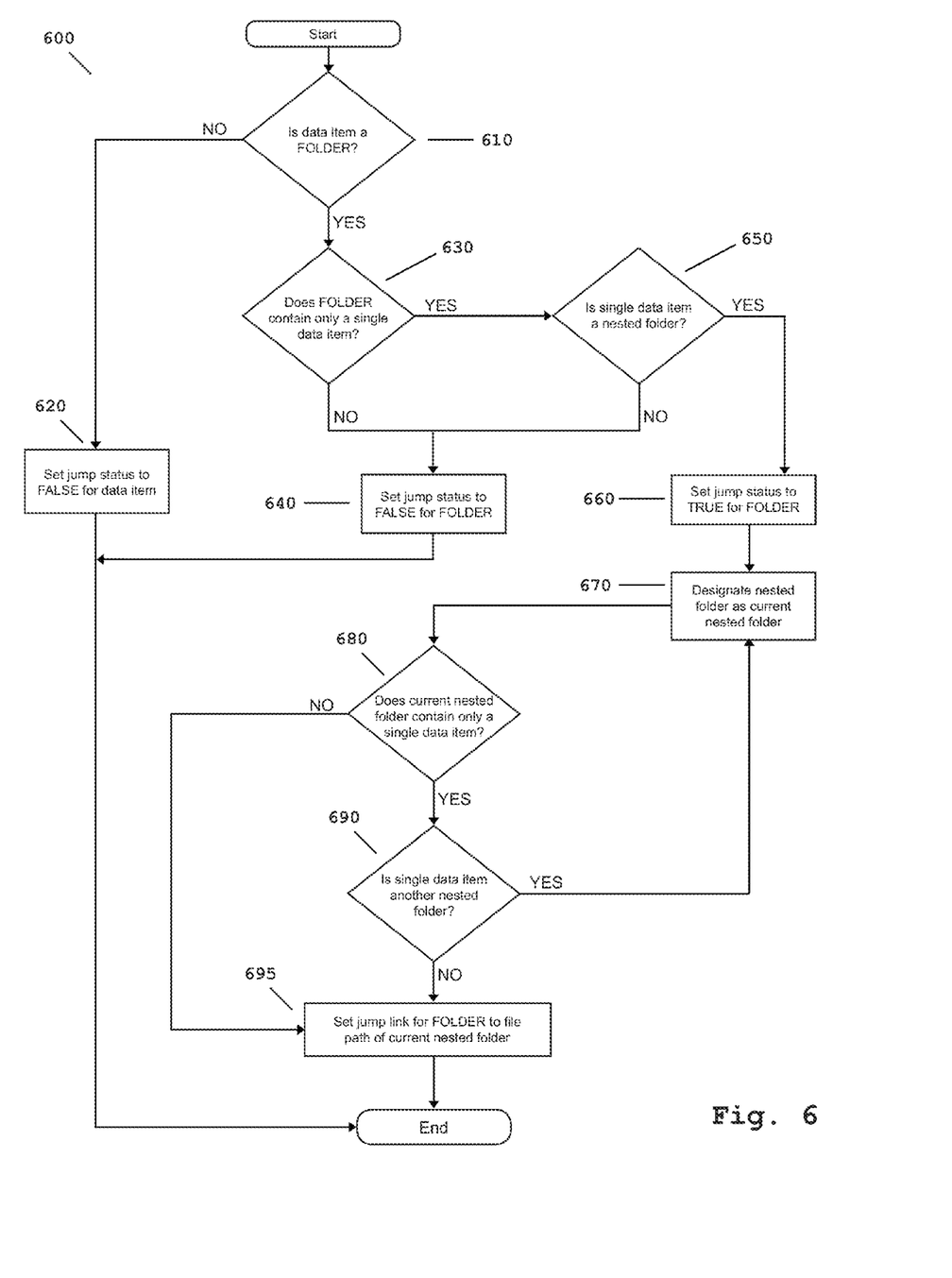
FIG. 6 illustrate a flow chart of a conceptual process used by some embodiments to determine folder that can be skipped and a file path for the destination of a folder.

FIG. 6 illustrates a flow chart of a conceptual process 600 used by some embodiments to populate the jump status and jump link fields in a table/index of data items. The process 600 may be executed for each data item in a file system that will use the features of the present invention. As previously stated, each data item in a file system may be recorded as an entry in a table or index of all data items in the file system.

First, the process 600 begins by determining (at 610) whether the data item is a folder. If the data item is not a folder, then the jump status field for that data item will be set (at 620) to 'false' and end because the particular data item is a file and files will not be skipped (unless the file or the file extension is in an exclusion list as discussed above, requiring a further step of checking the exclusion list).

If the data item is a folder, then the process 600 will determine (at 630) whether the folder contains only one data item. If the folder contains more than one data item, then the process will set (at 640) the jump status to 'false' for the folder and end. If it is determined (at 630) that the folder contains only a single data item, then the process 600 will determine (at 650) whether the single data item is a nested folder. If the single data item in the folder is not a nested folder, then the process 600 will set (at 640) the jump status of the folder to 'false' and end. If it is determined (at 650) that the single data item in the folder is a nested folder, then the process 600 will set (at 660) the jump status for the folder to 'true'. The process 600 will then designate (at 670) the nested folder as the current nested folder.

The process 600 may then determine (at 680) whether the current nested folder contains only a single data item. If the nested folder has multiple data items or no data items then the process 600 will set (at 695) the jump link field for the folder to the file path of the current nested folder. Therefore, when a user clicks on the original folder and it has a jump status set to 'true' and its jump link is set to a nested folder, the user will be taken directly to the contents of the current nested folder, which is set as the linked path in the jump link field for the user selected folder.

If the current nested folder contains only a single data item, the process 600 will then determine (at 690) whether the single data item is another nested folder. If the only single data item in the current nested folder is another nested folder, then this next nested folder is designated (at 670) as the current nested folder and the process 600 will again execute steps 680, 690, and 670 recursively until the nested folder either contains multiple data items, a single file, or no data. When it is determined (at 690) that the current nested folder does not contain another lone nested folder, the jump link for the folder is set (at 695) to the file path of the current nested folder.

Therefore, the process 600 will continue to go through a hierarchy of nested folders until it reaches a nested folder that has two or more data items, a single file, or no files. Once the destination nested folder is determined, that destination folder path is linked to the starting folder using the jump link field in the table/index of data items. Since this process 600 is executed for all data items, all intermediate folders containing only a single nested folder will also have their jump status set to 'true' with the destination link being the same as the parent folder of the intermediate folder.

The process 600 illustrated in FIG. 6 may be completed for all data items in a file system the first time a computer program for providing the feature of the present invention is executed on a computing system. The first initial identification of jump status and jump links may require processing time, and therefore be executed on a local machine's operating system via a client computer application. This process may occur while the computer is idle or on demand based on user instructions. If the file system table is for a remote storage location, this process may be executed at the local computer via a client application to create the initial data item table for the remote file system. The table may then subsequently be transmitted to the remote storage service in order to alleviate the need for processing all data items at the remote server.

In the case of a remote backup or synchronization service, each time a client application on the local machine transmits data to the remote storage service, the client application may also send updated information about jump status and jump links for the data item being transmitted as well as update all data items that may be affected by new data being added in the file system. For example, if a data item is added to an intermediate folder, then the jump status for all parent folders may need to be updated accordingly. Updates may only need to occur when a write operation is performed in a folder that has its status as a jump folder set to 'true', if a delete operation occurs within any folder, or when a folder is newly created, copied, or moved.

If a user interacts with a remote file system via a web application, then the process 600 may need to be executed at the remote server in order to properly update the jump status and jump links for any affected data items. This update may occur anytime a write or delete operation is performed at the remote storage. One of ordinary skill in the art would appreciate that this process 600 may be applied to local file systems and remote file systems similarly in order to achieve the goal of the present invention and without departing from the sprit or the scope of the present invention.

Figure 7:
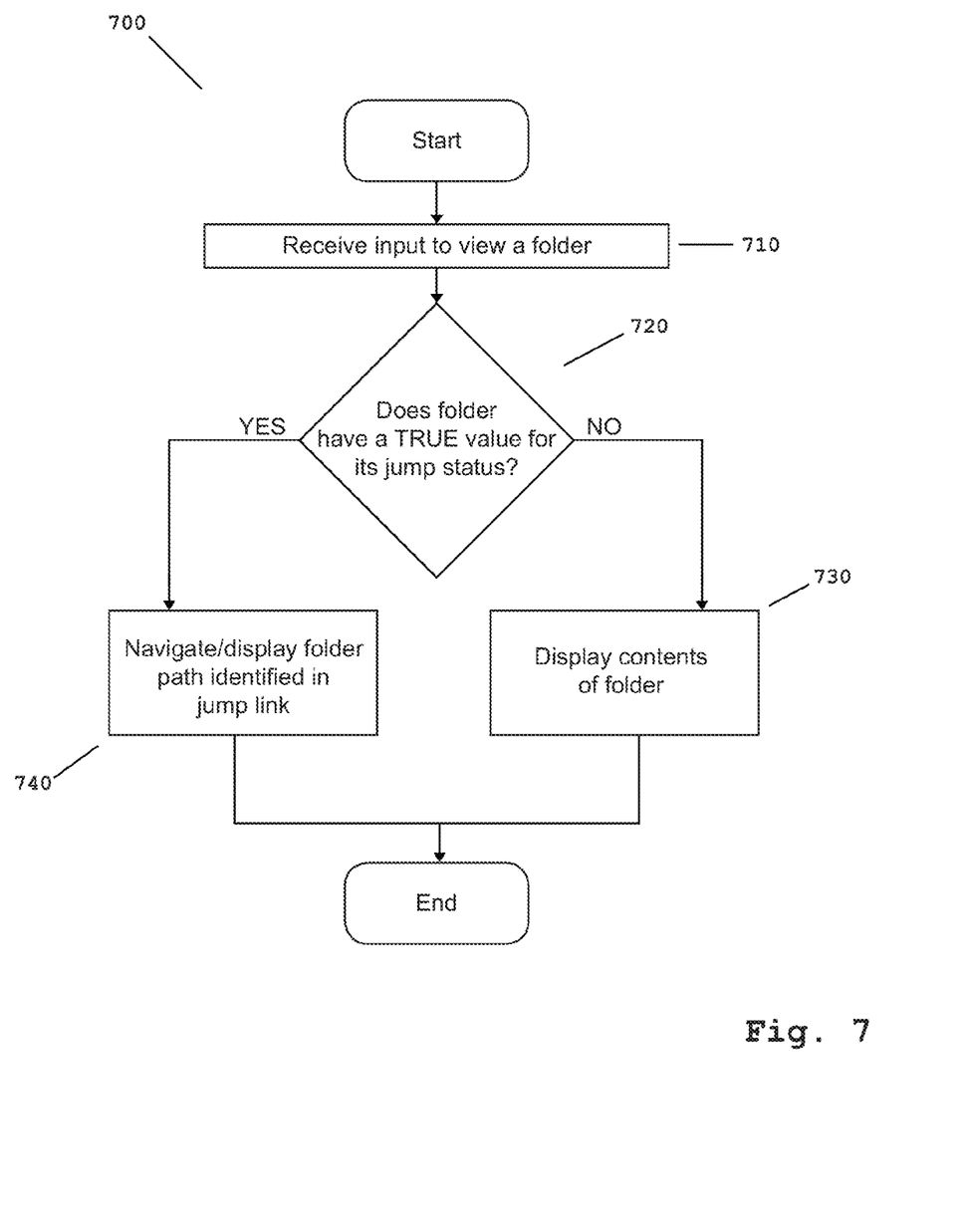
FIG. 7 illustrates a flow chart of a conceptual process used by some embodiments to jump empty folders.

FIG. 7 illustrates a flow chart of a conceptual process 700 used by some embodiments to jump pasty empty child folders based on information in the file system table/index. The process 700 begins by first receiving (at 710) a user input to view a folder. The process 700 will then determine (at 720) whether the selected folder has a 'true' value set as its jump status in the file system table/index. If the jump status is set to 'false' then the process 700 will display (at 730) the contents of the folder and end. If the jump status of the folder is set to 'true', then the process 700 will navigate to and display (at 730) the location identified in the jump link field for the selected folder.

The destination location identified in the jump link field may be the first nested folder in the hierarchy of folders that contains multiple data items, a single file, or no data. In the case where an exclusion list is provided by a user, any files or file extensions found in the exclusion list would be treated as if they were not present in the file system.

One of ordinary skill in the art will recognize that the processes described in FIG. 4, FIG. 6, and FIG. 7 may be executed by sets of instructions defined and stored on a computer readable storage medium for a program or file system plug-in that incorporates some embodiments of the invention. In addition, the processes are conceptual processes, and the actual implementations may vary. For example, different embodiments may define the various sets of instructions in a different order, may define several sets of instructions in one operation, may decompose the definition of a single set of instructions into multiple operations, etc. In addition, the processes may be implemented as several sub-processes or combined with other operations within a macro-process.

Many of the processes and modules described above may be implemented as software processes that are specified as at least one set of instructions recorded on a non-transitory physical storage medium. When these instructions are executed by one or more computational elements (e.g., microprocessors, microcontrollers, Digital Signal Processors ("DSPs"), Application-Specific ICs ("ASICs"), Field Programmable Gate Arrays ("FPGAs"), etc.) the instructions cause the computational element(s) to perform actions specified in the instructions.

Figure 8:
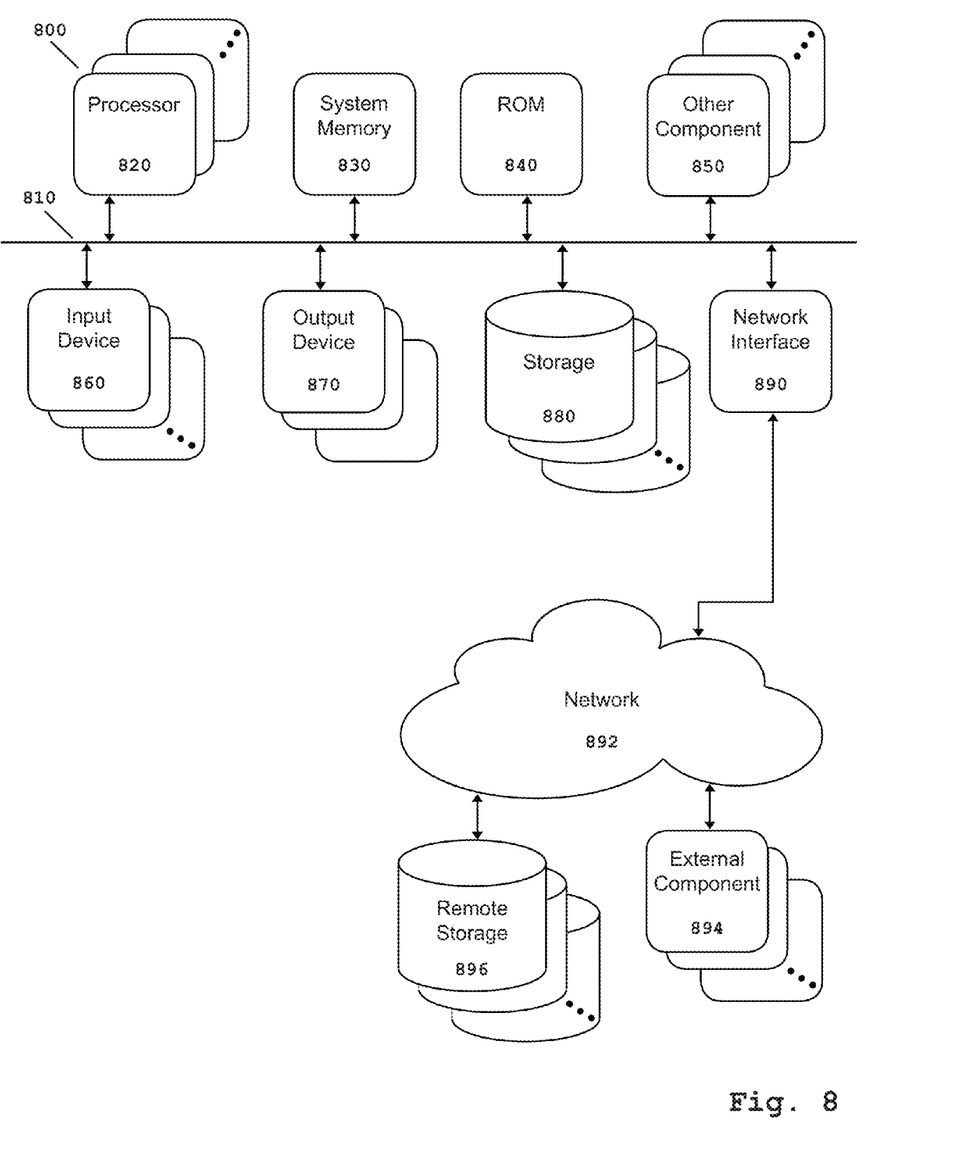
FIG. 8 illustrates a schematic block diagram of a conceptual computer system with which some embodiments of the invention may be implemented.

FIG. 8 illustrates a schematic block diagram of a conceptual computer system 800 with which some embodiments of the invention may be implemented. For example, the processes described in reference to FIG. 4, FIG. 6, and FIG. 7 may be at least partially implemented using sets of instructions that are executed using computer system 800.

Computer system 800 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 800 may include a bus 810, at least one processing element 820, a system memory 830, a read-only memory ("ROM") 840, other components (e.g., a graphics processing unit) 850, input devices 860, output devices 870, permanent storage devices 880, and/or a network connection 890. The components of computer system 800 may be electronic devices that automatically perform operations based on digital and/or analog input signals. For instance, the various example share modules described may be at least partially implemented using sets of instructions that are run on computer system 800.

Bus 810 represents all communication pathways among the elements of computer system 800. Such pathways may include wired, wireless, optical, and/or other appropriate communication pathways. For example, input devices 860 and/or output devices 870 may be coupled to the system 800 using a wireless connection protocol or system. The processor 820 may, in order to execute the processes of some embodiments, retrieve instructions to execute and data to process from components such as system memory 830, ROM 840, and permanent storage device 880. Such instructions and data may be passed over bus 810.

ROM 840 may store static data and instructions that may be used by processor 820 and/or other elements of the computer system. Permanent storage device 880 may be a read-and-write memory device. This device may be a non-volatile memory unit that stores instructions and data even when computer system 800 is off or unpowered. Permanent storage device 880 may include a mass-storage device (such as a magnetic or optical disk and its corresponding disk drive).

Computer system 800 may use a removable storage device and/or a destination storage device as the permanent storage device. System memory 830 may be a volatile read-and-write memory, such as a random access memory ("RAM"). The system memory may store some of the instructions and data that the processor uses at runtime. The sets of instructions and/or data used to implement some embodiments may be stored in the system memory 830, the permanent storage device 880, and/or the read-only memory 840. For example, the various memory units may include instructions for authenticating a client-side application at the server-side application in accordance with some embodiments. Other components 850 may perform various other functions. These functions may include interfacing with various communication devices, systems, and/or protocols.

Input devices 860 may enable a user to communicate information to the computer system and/or manipulate various operations of the system. The input devices may include keyboards, cursor control devices, audio input devices and/or video input devices. Output devices 870 may include printers, displays, and/or audio devices. Some or all of the input and/or output devices may be wirelessly or optically connected to the computer system.

Finally, as shown in FIG. 8, computer system 800 may be coupled to a network 892 through a network adapter 890. For example, computer system 800 may be coupled to a web server on the Internet such that a web browser executing on computer system 800 may interact with the web server as a user interacts with an interface that operates in the web browser.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices such as hard drive, compact disc, flash memory, volatile memory, but does not include a transitory, wireless, or other ephemeral signals.

It should be recognized by one of ordinary skill in the art that any or all of the components of computer system 800 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention can be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

We claim:

1. A physical computer readable medium storing an application for execution by at least one processor, the application comprising sets of instructions for:
    setting a jump status for all non-folder data items in a file system to false;
    identifying a set of folders in the file system that contain only one child folder and one of (i) no other data items or (ii) data items designated in an exclusion list, as jump folders;
    setting the jump status of all jump folders to true;
    setting the jump status for all folders that are not jump folders to false;
    identifying, for each jump folder, a destination folder, wherein the destination folder is a first nested folder within the jump folder that contains one of (i) two or more data items, (ii) a single file, or (iii) no data items;
    linking each jump folder to the jump folder's identified destination folder;
    receiving a user input to view the contents of a file folder in the file system;
    providing the content of the file folder when the jump status of the file folder is set to false; and
    providing, when the jump status of the file folder is set to true, the contents of the jump folder's identified destination folder.

2. The physical computer readable medium of claim 1, wherein the exclusion list includes user identified files.

3. The physical computer readable medium of claim 1, wherein the exclusion list includes user identified file extensions.

4. The physical computer readable medium of claim 1, further comprising sets of instructions for:
    displaying a breadcrumb trail of the destination folder;
    receiving a user input of a folder selection in the breadcrumb trail; and
    displaying the contents of the folder selected in the breadcrumb trail.

5. The physical computer readable medium of claim 1 further comprising sets of instructions for storing the jump status of each data item in the file system in a file index.

6. The physical computer readable medium of claim 1 further comprising sets of instructions for storing a file path of each jump folder's identified destination folder in a file index.

7. The physical computer readable medium of claim 1 further comprising sets of instructions for:
    detecting a write or delete operation at a particular folder in the file system;
    updating the jump status of every parent and child folder of the particular folder based on the detected operation; and
    updating the destination folder for each parent and child folder of the particular folder.

8. A method for skipping empty folders when navigating a file system comprising:
    setting a jump status for all non-folder data items in a file system to false;
    identifying a set of folders in the file system that contain only one child folder and one of (i) no other data items or (ii) data items designated in an exclusion list, as jump folders;
    setting the jump status of all jump folders to true;
    setting the jump status for all folders that are not jump folders to false;
    identifying, for each jump folder, a destination folder, wherein the destination folder is a first nested folder within the jump folder that contains one of (i) two or more data items, (ii) a single file, or (iii) no data items;
    linking each jump folder to the jump folder's identified destination folder;
    receiving a user input to view the contents of a file folder in the file system;
    providing the content of the file folder when the jump status of the file folder is set to false; and providing, when the jump status of the file folder is set to true, the contents of the jump folder's identified destination folder.

9. The method of claim 8, wherein the exclusion list includes user identified files.

10. The method of claim 8, wherein the exclusion list includes user identified file extensions.

11. The method of claim 8 further comprising:
displaying a breadcrumb trail of the destination folder;
receiving a user input of a folder selection in the breadcrumb trail; and
displaying the contents of the folder selected in the breadcrumb trail.

12. The method of claim 8 further comprising storing the jump status of each data item in the file system in a file index.

13. The method of claim 8 further comprising storing a file path of each jump folder's identified destination folder in a file index.

14. The method of claim 8 further comprising:
detecting a write or delete operation at a particular folder in the file system;
updating the jump status of every parent and child folder of the particular folder based on the detected operation; and
updating the destination folder for each parent and child folder of the particular folder.

* * * * *